United States Patent [19]
Smith

[11] Patent Number: 5,839,750
[45] Date of Patent: Nov. 24, 1998

[54] LEAF SPRING WHEEL SUSPENSION SYSTEM

[75] Inventor: E. Dallas Smith, Indianapolis, Ind.

[73] Assignee: DBX Engineering Corporation, Indianapolis, Ind.

[21] Appl. No.: 792,972

[22] Filed: Jan. 31, 1997

[51] Int. Cl.[6] ............... B60G 5/053; B60G 3/14; B60G 11/36; B60G 11/46
[52] U.S. Cl. ............... 280/683; 280/685; 280/686; 280/124.128; 280/124.163; 280/124.165
[58] Field of Search ................... 280/697, 699, 280/698, 701, 712, 713, 715, 718, 720, 724, 725, 686, 683, 685, 124.128, 124.132, 124.133, 124.157, 124.162, 124.163, 124.165, 124.17, 124.75, 124.179

[56] References Cited

U.S. PATENT DOCUMENTS

| | | |
|---|---|---|
| 2,507,980 | 5/1950 | Knapp . |
| 2,575,065 | 11/1951 | Merry ................................. 280/686 |
| 2,612,387 | 9/1952 | Ronning ............................. 280/686 |
| 3,078,104 | 2/1963 | Chalmers . |
| 3,140,880 | 7/1964 | Masser . |
| 3,356,386 | 12/1967 | Taylor . |
| 3,361,443 | 1/1968 | Wolf ................................... 280/686 |
| 3,704,898 | 12/1972 | Schmidt . |
| 3,884,502 | 5/1975 | Wagner . |
| 3,904,219 | 9/1975 | Guerriero ........................... 280/718 |
| 4,032,167 | 6/1977 | Chereda . |
| 4,095,818 | 6/1978 | Smith ................................. 280/789 |
| 4,166,640 | 9/1979 | Van Denberg ..................... 280/711 |
| 4,202,564 | 5/1980 | Strader .............................. 280/678 |
| 4,252,340 | 2/1981 | Egging ............................... 280/682 |
| 4,273,357 | 6/1981 | Pashkow ............................ 280/697 |
| 4,580,798 | 4/1986 | Roelofs . |
| 4,615,539 | 10/1986 | Pierce ................................ 280/690 |
| 4,666,181 | 5/1987 | Wegner .............................. 280/711 |
| 4,718,692 | 1/1988 | Raidel ................................ 280/713 |
| 4,878,691 | 11/1989 | Cooper et al. .................... 280/789 |
| 4,934,733 | 6/1990 | Smith et al. ....................... 280/711 |
| 5,016,912 | 5/1991 | Smith et al. ....................... 280/711 |
| 5,275,430 | 1/1994 | Smith ................................. 280/711 |
| 5,366,237 | 11/1994 | Dilling et al. . |
| 5,379,842 | 1/1995 | Terry . |
| 5,433,287 | 7/1995 | Szalai et al. . |

FOREIGN PATENT DOCUMENTS

| | | | |
|---|---|---|---|
| 623587 | 4/1963 | Belgium ........................... 280/699 |
| 1385600 | 4/1964 | France ............................. 280/699 |
| 84-01218 | 11/1985 | Netherlands ..................... 280/698 |
| 657466 | 9/1951 | United Kingdom ............. 280/699 |
| 692854 | 6/1953 | United Kingdom . |

Primary Examiner—Peter C. English
Attorney, Agent, or Firm—Woodard, Emhardt, Naughton, Moriarity & McNett

[57] ABSTRACT

A wheel suspension including a wheel support pivotally attached to a vehicle frame at two, laterally-spaced locations, the wheel support being pivotable between uppermost and lowermost positions, a wheel rotatably mounted to the wheel support, a leaf spring mounted between the vehicle frame and the wheel support to bias the wheel support to a position intermediate the uppermost, and lowermost positions, and a second biasing device, such as an air bag or coil spring, mounted outside of the vehicle frame and biasing the wheel support to an intermediate position.

38 Claims, 3 Drawing Sheets

LEAF SPRING WHEEL SUSPENSION SYSTEM

BACKGROUND OF THE INVENTION

Field of the Invention

This invention relates to the field of wheel suspensions, and particularly to wheel suspension systems that independently support the wheels of a vehicle in which a wide and low cargo floor is desired. This invention is an improvement to the wheel suspension systems described in my earlier patents, namely, U.S. Pat. No. 4,934,733, issued on Jun. 19, 1990, U.S. Pat. No. 5,016,912, issued on May 21, 1991, and U.S. Pat. No. 5,275,430, issued on Jan. 4, 1994.

For a variety of reasons, it is frequently desirable to have the cargo floor of a trailer, van, or similar vehicle as low as reasonably possible. A low floor provides for more efficient transportation of cargo, giving a vehicle more useable, internal space for given exterior dimensions. Also, a low floor placed close to the road surface makes for easier access to the vehicle. These and other advantages of a low cargo floor have motivated various proposals for low vehicle floors.

In U.S. Pat. No. 4,032,167, there is disclosed a trailer for transporting motorcycles. This trailer includes wheels mounted to fixed spindles that are bolted to a rigid frame. Because of this rigid attachment, considerable forces are imparted to the frame. Further, rigidly fixed wheels will have undesirable effects on the handling and ride comfort of a vehicle.

In another type of suspension system, the vehicle is supported on a through axle that extends the width of the vehicle below the vehicle frame. Examples of this are found in U.S. Pat. Nos. 4,580,798 and 4,615,539. Because the axle extends the entire width of the vehicle, the cargo space of the vehicle must be adapted to fit over the axle. Thus, the axle and the diameter of the wheel establish the height of the cargo floor above the ground.

In a different type of wheel suspension system, the through axle extending the width of the vehicle is replaced with short, independent axles present only at the sides of the vehicle. An example of this is shown in U.S. Pat. No. 4,666,181. This short independent axle is attached to a support arm, which is pivotably attached to the vehicle frame. With this type of suspension, the axle and wheel diameter no longer create a minimum height for the vehicle cargo floor. Other considerations, such as ground clearance, establish the height of the cargo floor. The suspension system components reside in or around the wheel well. This area around the wheel well, however, still represents limitations to the cargo area. Further compaction of the wheel suspension system will result in more efficient and convenient use of cargo space.

SUMMARY OF THE INVENTION

Briefly describing one aspect of the present invention, there is provided a wheel suspension system for a cargo vehicle, such as a trailer, semi-trailer, van, truck, or other vehicle in which a wide and low cargo floor is desired. The invention comprises a wheel support which attaches to both the vehicle frame and wheel. The connection of the wheel support to the frame occurs at two, pivotable attachments inboard of the wheel. The attachments are laterally displaced from each other, one pivot being inboard of the other. This lateral displacement of the pivots provides lateral stiffness to the support arm, without the use of separate lateral support devices as seen in the prior art. The attachment of the wheel to the support arm is through a short stub axle of a type commonly known in the art. The two pivotable attachments are also displaced longitudinally from the wheel axis.

Another aspect of this invention concerns a means for biasing the position of the support arm. The biasing means in general attaches to both the wheel support and the vehicle frame. The biasing means may be a coil spring, leaf spring, airbag, or other similar device known to those skilled in the art. The biasing means imparts forces which tend to keep the support arm in an intermediate position relative to the frame, that is, between uppermost and lowermost positions. In the present invention, there are preferably two biasing means, one located above the axis of the wheel and the other positioned inboard of the wheel.

In another aspect of this invention, there are two wheels and wheel supports located on the same side of the vehicle. Each wheel support has its own upper biasing means, but the two wheel supports share a common inboard biasing means. In a further aspect of this invention, this common inboard biasing means is a leaf-type spring. The attachment of the ends of the spring to the wheel supports preferably permits sliding of the spring on the support.

It is an object of the present invention to provide a wheel suspension system that is compact, with minimal infringement of space otherwise useful for carrying cargo.

Another object of the present invention is to provide a wheel suspension system that is simple in design and economical to manufacture.

It is a further object of the present invention to provide a wheel suspension system which permits the cargo space to be close to the ground.

These and other features and advantages will be apparent from the following description of the preferred embodiment of the invention.

DESCRIPTION OF THE PREFERRED EMBODIMENT

Figure 1:
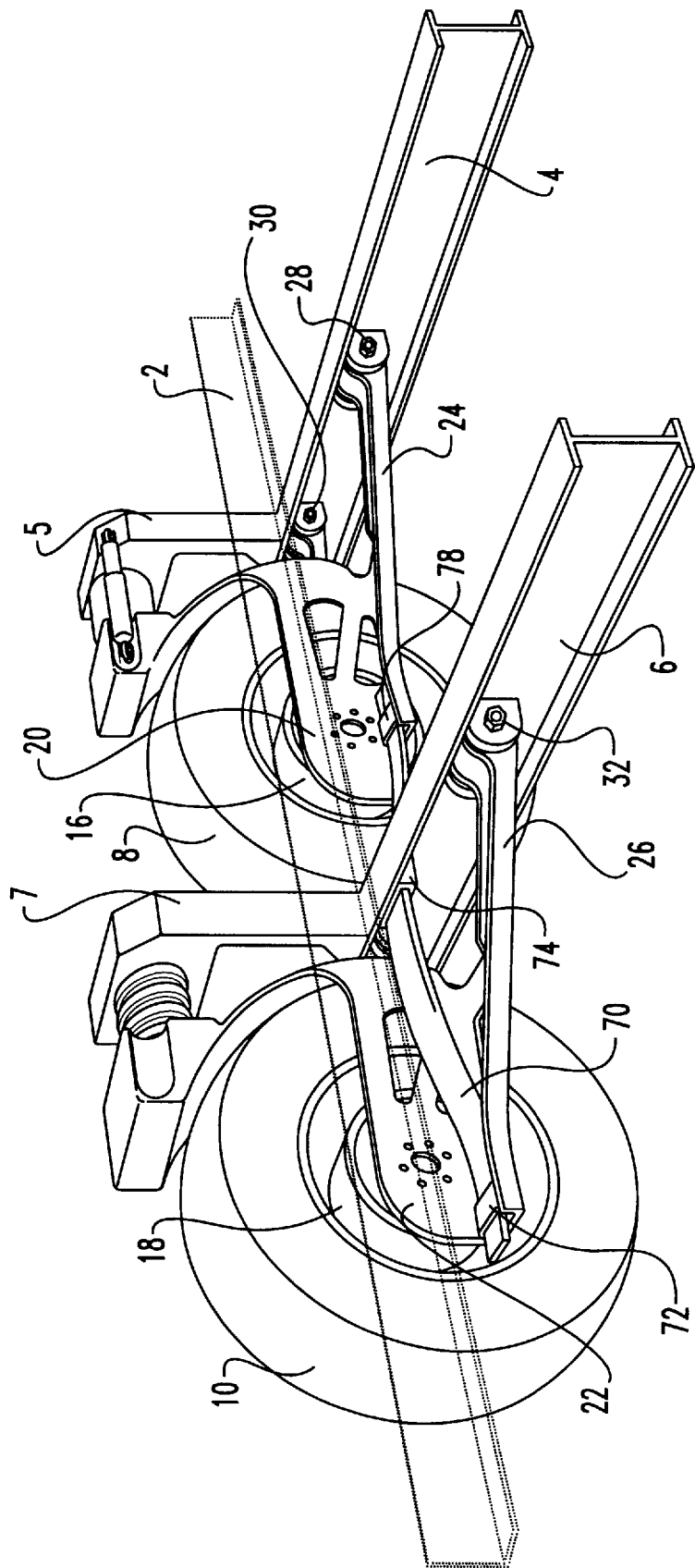
FIG. 1 is a perspective view of a pair of wheel suspension systems constructed in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides a wheel suspension system which has an extremely low profile. The suspension system utilizes a wheel support that is connected with the vehicle frame by a pair of arms having points of attachment to the frame which are spaced apart laterally, thereby providing lateral support for the wheel. The wheel support is pivotable between an uppermost position and a lowermost position. One or two biasing means are included to maintain the wheel support in an intermediate position and to absorb loads from the wheel.

Referring in particular to FIG. 1, there is shown a wheel suspension system constructed in accordance with the present invention. The system includes a pair of wheels mounted to a vehicle frame by respective wheel supports. The wheel supports are maintained in position by a leaf spring secured between the wheel support and the frame.

The two wheels are shown mounted on the same side of the vehicle, and of course similar wheels and suspension systems are used on the opposite side of the vehicle. It will further be appreciated that the present invention is equally useful when only one wheel is supported on each side of the vehicle. Also, the embodiment of FIG. 1 utilizes a single leaf spring, but could equally use separate biasing means serving the function of the spring.

The wheels are attached to cross members of the vehicle frame by wheel supports. The wheel supports attach to the cross member at a pair of pivot points, with one pivot point being inboard of the other pivot point. This lateral displacement of one pivot point relative to the other promotes the lateral stability of the wheel support. The frame cross members are held in position by a longitudinal member of the frame.

The wheel support connects to the frame cross member on a portion of the support that is largely horizontal and parallel to the roadway. The wheel support also has a section that is largely vertical relative to the roadway, to which the wheel, spring and shock absorber attach. The spring and shock absorber attach to the vertical portion of the wheel support and also a vertical member of the frame. The upright portion of the wheel support is adaptable to springs such as the coil type, air bag type, or any other type of spring that creates a spring force when its attachment points are displaced relative to each other.

There is an additional spring that acts between the wheel support and the frame. This spring is of the leaf type, and attaches to both the horizontal portion of the wheel support and also to the frame. In a preferred embodiment, the attachment of the spring to the wheel support permits relative sliding of the spring within the wheel support in the fore and aft directions, but otherwise transmits spring forces created by the pivoting of the wheel support relative to the frame cross member. Alternative attachments of the leaf spring may be used, including an attachment by which one end of the spring is secured to a wheel support and the portion connected with the vehicle frame is allowed to slide relative thereto. Additionally, a spring configuration and attachment could be employed in which all attachments of the spring prevent or allow for sliding movement.

It is a feature of the leaf spring design that a biasing device is provided that fits generally within the vehicle frame. The leaf spring is located interior of the frame perimeter. It is also positioned below the upper surface of the frame, and thereby does not intrude into space available above the frame for the bed of the vehicle, e.g., the floor of a trailer or van. As shown in FIG. 1, the leaf spring is conveniently received through an opening in a frame member, thus accomodating the position of the leaf spring and minimizing the space required for the spring.

This leaf spring may be used simultaneously with adjacent wheels. The spring can attach, slidably or not, to two wheel supports and also be attached to a cross member of the frame in-between the two wheel supports.

The present invention provides a wheel suspension system useful in a variety of applications. The preferred embodiment is characterized by a wheel support with a largely vertical portion and a largely horizontal portion. The vertical portion is generally outboard of the vehicle frame. The horizontal portion is below much of the vehicle frame. Also, the shock absorber and springs of the preferred embodiment are similarly situated either outboard of much of the vehicle frame, or below much of the vehicle frame. This general arrangement permits maximum utilization of the area inboard and above most of the frame as useful cargo area. The wheel suspension system is useful, for example, for mounting the wheels of a trailer, or for the rear wheels of a front-wheel drive vehicle, such as a van.

Referring in particular to FIG. 1, there is depicted a preferred embodiment of the present invention in a perspective view. Frame outboard longitudinal member 2, shown with an "L" cross section, is a major structural member of the vehicle frame traversing fore and aft along one side of the vehicle and defining an outer perimeter of the frame. Attached to it are frame cross members 4 and 6, located fore and aft of each other, respectively. These cross members traverse the width of the vehicle, and typically terminate at the mirror image wheel suspension system on the other side of the vehicle frame. The frame cross members include frame vertical members 5 and 7, respectively, located outboard of longitudinal member 2.

Wheel suspension systems according to the present invention are mounted to the vehicle frame in the following manner. The wheel suspension systems include, for example, wheel supports 24 and 26. The supports carry stub axles or the like to support wheels thereon. In turn, the wheel supports are mounted to the vehicle frame for pivoting about a horizontal axis, thereby allowing the carried wheel to move up and down with respect to the vehicle frame.

Figure 3:
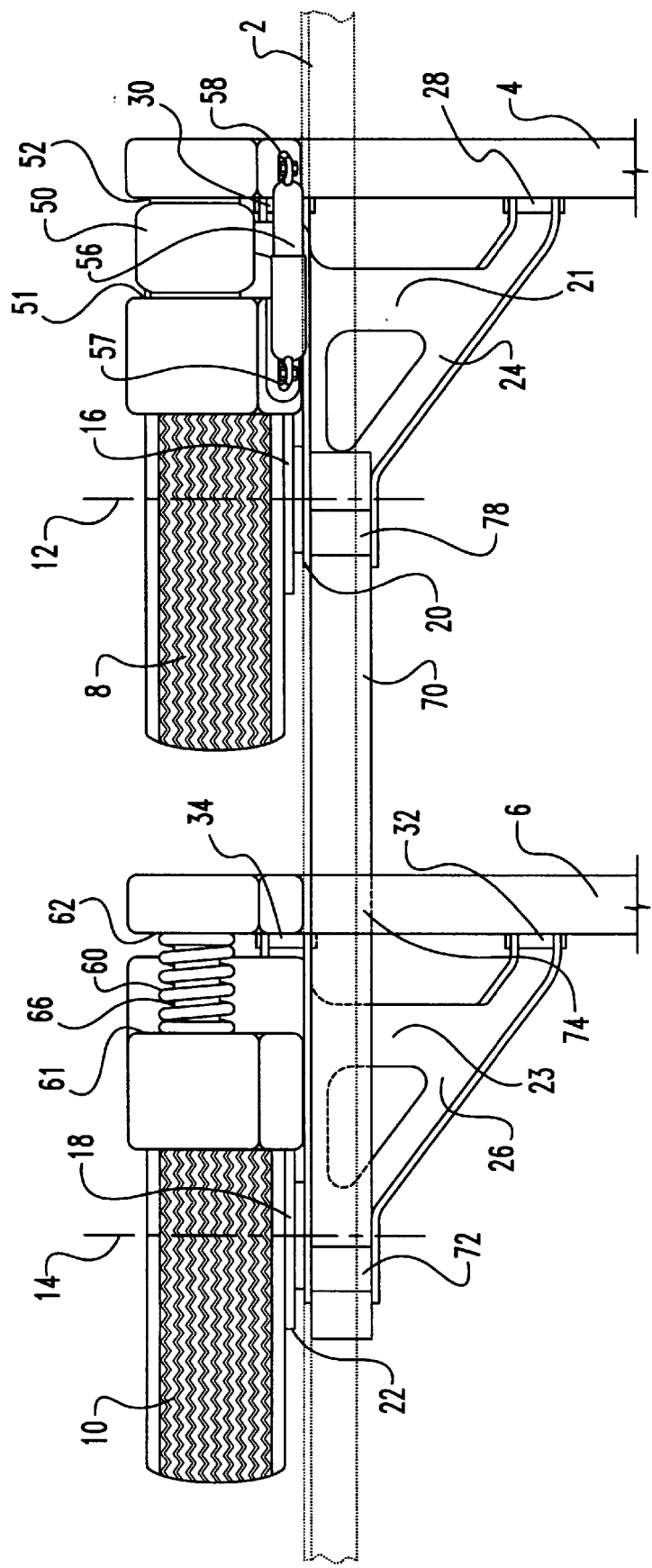
FIG. 3 is a top plan view of the wheel assemblies of FIG. 1.

Located just aft of the cross members are wheels 8 and 10. These wheels are attached to the wheel supports 24 and 26, respectively, and are free to rotate about respective hubs. For example, wheel 8 is mounted to hub 16 and is free to rotate about a horizontal axis 12 (FIG. 3). This hub is attached to upright portion 20 of wheel support 24. Although a wheel suspension system has been shown and described in which the pivoting axis is positioned forward of the rotational axis, the present invention also contemplates those embodiments in which the rotational axis is positioned forward of the pivoting axis.

The wheel support further includes means for attaching pivotally to the vehicle frame. The support preferably has a generally flat, horizontal portion 21 attached pivotally to frame cross member 4 at inboard pivotal attachment 28 and outboard pivotal attachment 30. The attachments preferably comprise a bracket secured to the frame, and a bolt and nut received through apertures in the bracket and the associated portion of the wheel support. These two pivotal attachments are aligned to provide for pivoting about a horizontal axis extending therethrough. The pivotal attachments are also displaced laterally to enhance the lateral stability of the wheel support, and therefore of the first wheel 8.

A similar method is used to attach wheel 10 to frame cross member 6. Hub 18, about which second wheel 10 is free to rotate, is attached to upright portion 22 of wheel support 26. This wheel support further includes a horizontal portion 23 which is pivotally attached to frame cross member 6 at pivotal attachments 32 and 34. The wheel support 26 is thereby pivotal with respect to the frame about a horizontal axis extending through the pivotal attachments 32 and 34, and the wheel 10 is rotatable about an axis 14 (FIG. 3) which extends parallel to the pivoting axis.

Figure 2:
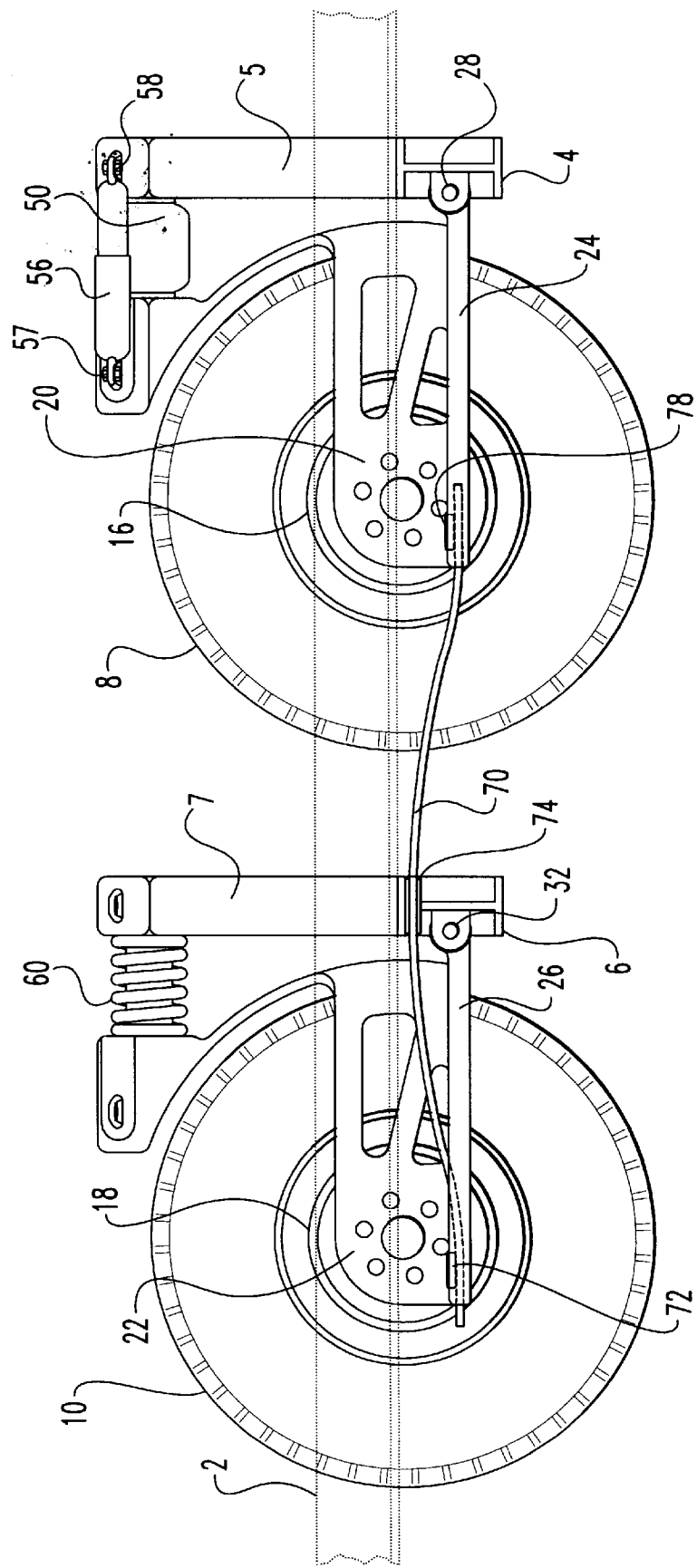
FIG. 2 is a side elevational view of the wheel assemblies and wheels mounted to a vehicle frame, viewing outwardly from inboard of the assemblies.

The upright portions of the wheel supports attach not only to the hubs, but also continue around the forward upper quadrant of the respective wheels and attach to spring and shock absorber assemblies. As shown in FIGS. 2 and 3, air spring (air bag) 50 and shock absorber 56 both connect support upright portion 20 to frame vertical member 5. Air spring 50 is attached at face 51 of first wheel support 24, and also at face 52 of first frame vertical member 5, in conventional fashion. Shock absorber 56 is mounted in a typical manner along side air spring 50, to first wheel support 24 at pivotal attachment 57, and to first frame vertical member 5 at pivotal attachment 58. As wheel support 24 rotates about pivots 28 and 30, the distance between upright portion 20 and vertical member 5 changes. The air bag and shock absorber accomodate this movement and cushion the pivoting of the wheel support.

An alternate to the spring and shock absorber arrangement utilizes a coil spring 60, as shown attached between wheel support 26 and frame vertical member 7 in conventional fashion. This spring attaches to front spring mount 62 of vertical member 7, and to rear spring mount 61 of wheel support 26. When utilizing a coil spring, the shock absorber could be attached alongside the spring, similar to the positioning shown for shock absorber 56, or it could be attached coaxially with the coil spring. Shock absorber 66 is shown mounted between frame vertical member 7 and wheel support 26 inside the coils of coil spring 60.

Additionally spring support for the wheel occurs in respect to the horizontal portions of the wheel support members. The horizontal portion is configured to be substantially flat and to underlie the vehicle frame. It is a feature of the present invention that such a compact wheel support is also supportable in a manner to further enhance the low profile of the overall suspension in comparison to the vehicle frame.

The wheel support engages a leaf spring 70 that is secured between the support and the vehicle frame. Each wheel support can be combined with an individual leaf spring. Alternatively, pairs of wheel supports can be accomodated by a single leaf spring, as shown in the drawings. In general, a wheel support includes a leaf spring receiving member for connection with an end of the leaf spring. Leaf spring 70 is shown having a forward portion received within a narrow slot comprising a leaf spring forward attachment 78. Leaf spring 70 continues in the aft direction, attaching to the frame by means of the frame attachment 74 through which it passes. Aft of that location the leaf spring includes a portion received within the rear attachment 72 defined by the wheel support 26.

Frame attachment 74 prevents lateral, longitudinal or vertical motion of the leaf spring at the point of attachment. However, pivoting is permitted about the lateral access established by frame attachment 74.

As wheel support 24 pivots about the axis defined by the attachments 28 and 30, the forward attachment 78 of the wheel support moves in an arc relative to cross member 4. The distance between attachments 74 and 78 changes as the wheel support pivots. Attachment 78 permits sliding of leaf spring 70 in the fore and aft directions. Thus, a change in the fore/aft distance between attachments 74 and 78 does not result in the creation of spring load from spring 70. However, attachment 78 does resist any change in the vertical distance between attachments 78 and 74. Thus, rotation of the wheel support results in a change in spring load of spring 70 for the vertical component of movement.

Although the preferred embodiment depicts a single leaf spring attached near its center in providing support to wheel supports both in front and behind it, it is also possible to use a single leaf spring for each wheel support. For example, it would be possible to remove all portions of leaf spring 70 aft of attachment 74, and have the remainder support only first wheel support 24. Similarly, it would also be possible to remove all portions of leaf spring 70 forward of attachment 74, thus providing support only to second wheel support 26. Thus, leaf spring 70 could provide independent support for each wheel support, and the attachment of that independent leaf spring, could either be forward or aft of the respective wheel rotational axis.

What is claimed is:

1. A wheel suspension system for mounting a wheel to a vehicle frame, the frame including an outer perimeter, said wheel suspension system comprising:

a wheel support attachable to the vehicle frame for pivoting about a first horizontal axis, said wheel support including means for rotatably supporting the wheel for rotation about a second axis parallel to the first axis;

attachment means for attaching said wheel support to the vehicle frame adjacent its outer perimeter to be pivotable about the first axis;

said wheel support having first and second portions spaced laterally from one another and spaced longitudinally from the second axis, said attachment means being for attaching the first and second portions of said wheel support to the vehicle frame for pivoting of said wheel support between an uppermost position and a lowermost position;

a leaf spring;

mounting means for mounting said leaf spring to the vehicle frame interior of the wheel supported by said wheel support, said wheel support defining a leaf spring receiving member and said leaf spring including a portion received by the receiving member of said wheel support, said leaf spring when mounted to the vehicle frame biasing said wheel support to a position between the uppermost and lowermost positions of said wheel support; and biasing means in addition to said leaf spring for biasing said wheel support to a position between the uppermost and lowermost positions of the wheel support, said biasing means being positioned above the first and second axes.

2. The system of claim 1 wherein the second axis is positioned forward of the first axis.

3. The system of claim 1 wherein said mounting means is for attaching said leaf spring to the vehicle frame to permit sliding movement of said leaf spring relative to the vehicle frame.

4. The system of claim 1 wherein said leaf spring is slidable relative to the leaf spring receiving member.

5. The system of claim 1 wherein said biasing means is located forward of the second axis.

6. The system of claim 5 in which said biasing means is located rearward of the first axis.

7. The system of claim 1 wherein said biasing means comprises a coil spring.

8. The system of claim 1 wherein said biasing means comprises an air bag.

9. The system of claim 1 and which further comprises a means for dissipating kinetic energy attached to said wheel support, and means for attaching said dissipating means to the vehicle frame.

10. The system of claim 9 wherein said dissipating means comprises a shock absorber.

11. The system of claim 1 and which further comprises:
a second wheel support attachable to the vehicle frame for pivoting about a third axis, said second wheel support including means for rotatably supporting a second wheel for rotation about a fourth axis parallel to the third axis; and
second attachment means for attaching said second wheel support to the vehicle frame adjacent its outer perimeter;
said second wheel support having first and second portions spaced laterally from one another and spaced longitudinally from the fourth axis, said second attachment means being for attaching the first and second portions of said second wheel support to the vehicle frame for pivoting of said second wheel support between an uppermost position and a lowermost position, said second wheel support defining a leaf spring receiving member and said leaf spring including a portion received by the receiving member of said second wheel support, said leaf spring when mounted to the vehicle frame biasing said second wheel support to a position between the uppermost and lowermost positions of said second wheel support.

12. The system of claim 11 in which the second and fourth axes are parallel.

13. A wheel suspension system for a vehicle frame comprising:
a wheel;
a wheel support attachable to the vehicle frame and pivotable about a first horizontal axis between an uppermost position and a lowermost position, said wheel support including means for rotatably supporting said wheel about a second axis parallel to the first axis, said wheel support having first and second portions spaced laterally from one another and spaced longitudinally from the second axis, said first and second portions pivotally attaching said wheel support to the vehicle frame;
a leaf spring for biasing said wheel support to a position between the uppermost and lowermost positions, said leaf spring being coupled to the vehicle frame, a portion of said leaf spring being received by said wheel support; and
biasing means in addition to said leaf spring for biasing said wheel support to a position between the uppermost and lowermost positions, said biasing means being positioned above the first and second axes.

14. The system of claim 13 wherein the second axis is positioned forward of the first axis.

15. The system of claim 13 wherein said biasing means is located forward of the second axis and rearward of the first axis.

16. The system of claim 13 wherein said biasing means comprises a coil spring.

17. The system of claim 13 wherein said biasing means comprises an air bag.

18. The system of claim 13 and which further comprises a shock absorber attached to said wheel support and to the vehicle frame, said shock absorber being positioned above the first axis and the second axis.

19. The system of claim 13 wherein the first axis is located below the second axis.

20. A wheel suspension system for a vehicle frame comprising:
a wheel;
a wheel support attachable to the vehicle frame and pivotable about a first horizontal axis between an uppermost position and a lowermost position, said wheel support including means for rotatable supporting said wheel about a second axis parallel to the first axis, the first axis being located below the second axis, said wheel support having first and second portions spaced laterally from one another for pivotally attaching said wheel support to the vehicle frame;
a leaf spring for biasing said wheel support to a position between the uppermost and lowermost positions; and
biasing means in addition to said leaf spring for biasing said wheel support to a position between the uppermost and lowermost positions, said biasing means being positioned above the first and second axes.

21. The system of claim 20 wherein the second axis is positioned forward of the first axis.

22. The system of claim 20 wherein said biasing means comprises a coil spring.

23. The system of claim 20 wherein said biasing means comprises an air bag.

24. The system of claim 20 and which further comprises a shock absorber attached to said wheel support and to the vehicle frame, said shock absorber being positioned above the first axis and the second axis.

25. A wheel suspension system for a vehicle frame comprising:
a wheel;
a wheel support attachable to the vehicle frame and pivotable about a first horizontal axis between an uppermost position and a lowermost position, said wheel support including means for rotatably supporting said wheel about a second axis parallel to the first axis, the first axis being located below the second axis, said wheel support having first and second portions spaced laterally from one another and spaced longitudinally from the second axis, said first and second portions pivotally attaching said wheel support to the vehicle frame; and
a leaf spring for biasing said wheel support to a position between the uppermost and lowermost positions, said leaf spring being mounted to the vehicle frame, a portion of said leaf spring being received by said wheel support.

26. The system of claim 25 which further comprises biasing means in addition to said leaf spring for biasing said wheel support to a position between the uppermost and lowermost positions, said biasing means being positioned above the first and second axes.

27. The system of claim 26 wherein said biasing means comprises a coil spring.

28. The system of claim 26 wherein said biasing means comprises an air bag.

29. The system of claim 25 wherein the second axis is positioned forward of the first axis.

30. The system of claim 25 and which further comprises a shock absorber attached to said wheel support and to the vehicle frame, said shock absorber being positioned above the first axis and the second axis.

31. An apparatus for a vehicle frame comprising:
a first wheel and a second wheel;
a first wheel support attachable to the vehicle frame and pivotable about a first horizontal axis between an uppermost position and a lowermost position, said wheel support rotatably supporting said first wheel about a second axis parallel to the first axis, the first axis being located below the second axis;
a second wheel support attachable to the vehicle frame and pivotable about a third horizontal axis between an uppermost position and a lowermost position, said second wheel support rotatably supporting said second wheel about a fourth axis parallel to the third axis, the third axis being located below the fourth axis; and a leaf spring for biasing said first wheel support to a position between the uppermost and lowermost positions thereof, said leaf spring biasing said second wheel support to a position between the uppermost and lowermost positions thereof.

32. The apparatus of claim 31 which further comprises biasing means in addition to said leaf spring for biasing said first wheel support to a position between the uppermost and lowermost positions thereof, said biasing means being positioned above the first and second axes.

33. The apparatus of claim 31 which further comprises biasing means for biasing said second wheel support to a position between the uppermost and lowermost positions thereof, said biasing means being positioned above the third and fourth axes.

34. The apparatus of claim 31, wherein said leaf spring is in contact with and slidable relative to at least one of said first wheel support and said second wheel support.

35. An apparatus for a vehicle frame comprising:

a first wheel and a second wheel;

a first wheel support attachable to the vehicle frame and pivotable about a first horizontal axis between an uppermost position and a lowermost position, said wheel support rotatably supporting said first wheel about a second axis parallel to the first axis;

a second wheel support attachable to the vehicle frame and pivotable about a third horizontal axis between an uppermost position end a lowermost position, said second wheel support rotatably supporting said second wheel about a fourth axis parallel to the third axis;

a leaf spring for biasing said first wheel support to a position between the uppermost and lowermost positions thereof, said leaf spring biasing said second wheel support to a position between the uppermost and lowermost positions thereof; and biasing means in addition to said leaf spring for biasing said first wheel support to a position between the uppermost and lowermost positions thereof, said biasing means being positioned above the first and second axes.

36. The apparatus of claim 35 wherein the first axis is located below the second axis.

37. The apparatus of claim 36 wherein the third axis is located below the fourth axis.

38. The apparatus of claim 35, wherein said leaf spring is in contact with and slidable relative to at least one of said first wheel support and said second wheel support.

* * * * *

UNITED STATES PATENT AND TRADEMARK OFFICE
CERTIFICATE OF CORRECTION

PATENT NO. : 5,839,750
DATED : November 24, 1998
INVENTOR(S) : E. Dallas Smith

It is certified that error appears in the above-indentified patent and that said Letters Patent is hereby corrected as shown below:

In column 10, line 5, please change "end" to --and--.

Signed and Sealed this

Twenty-third Day of November, 1999

Attest:

Q. TODD DICKINSON

*Attesting Officer*  *Acting Commissioner of Patents and Trademarks*